3,796,661
Patented Mar. 12, 1974

3,796,661
SULFURIZED TRIISOBUTYLENE
Jugmohan R. Suratwala, Beaumont, John E. May, Nederland, and Billy R. Allen, Bridge City, Tex., assignors to Texaco Inc., New York, N.Y.
No Drawing. Filed July 19, 1971, Ser. No. 164,055
Int. Cl. C10m 1/38
U.S. Cl. 252—45
3 Claims

ABSTRACT OF THE DISCLOSURE

Sulfurized triisobutylene, lubricating oil compositions thereof having improved extreme pressure properties and reduced copper corrosivity, and method of manufacture of said sulfurized triisobutylene comprising the sequential steps: (1) forming a mixture of triisobutylene and sulfur utilizing a mole ratio of triisobutylene to sulfur of between about 1:2.5 and 1:5 at between about 50 and 100° 100° F., (2) continuously blowing the resultant mixture with an inert gas at a rate of between about 0.1 and 1 s.c.f.g./gallon mixture at a temperature between about 375 and 465° F. under a continuous pressure of between about 20 and 100 p.s.i.g. until the free sulfur content in said resultant reaction mixture is less than 0.3 wt. percent; (3) stripping the blown mixture with inert gas at a rate of between about 0.1 and 1 s.c.f.g./gallon at a temperature of between about 320 and 360° F. at subatmospheric pressure; and (4) filtering the stripped product.

BACKGROUND OF INVENTION

Sulfurized polyolefins are known additives for lubricating oils. They are in essence mixtures of an infinite number of compounds. When formed by the reaction of di- and triisobutylene with sulfur the mixtures are theorized to be composed of major amounts of 4,5-dialkyl-1,2-dithiole-3-thiones and minor amounts of organic sulfides, polymeric sulfur substituted compounds and mercaptans. Sulfurized polyolefins have been found to be useful as extreme pressure (EP) agents in lubricating oils such as gear and cutting oils. The effectiveness of the sulfurized polyolefins is proportional to the amount of sulfur in the chemically active state therein as opposed to the inactive state. Expressed in another manner, the effectiveness of sulfurized polyolefin is dependent on the particular combination of compounds making up the product designated for conciseness as sulfurized polyolefin. The inactive sulfurized polyolefins are primarily employed in automotive crankcases as antioxidant additives particularly where metals coming in contact therewith are highly sensitive to corrosion, and therefore, could not tolerate active sulfur compounds.

The particular combination of compounds comprising what is known as sulfurized polyolefin is determined in large measure by the specific manufacturing procedure employed, therefore, sulfurized polyolefin is best characterized in terms of process.

One of the continuing searches in the sulfurized triisobutylene area is for a method of producing in the shortest possible time (for obvious reasons of economics) a sulfurized triisobutylene which has sufficiently active sulfur to satisfactorily function as an extreme pressure agent and yet remain relatively insensitive to copper, that is, to be of a particular combination of compounds to give a Copper Strip corrosion rating of less than 4A ASTM D–130–56 (3 hour/250° F.) at concentrations of about 1 wt. percent. The Copper Strip Test is a measure of the corrosivity of an additive to its metallic environment particularly copper.

U.S. Pat. 2,995,569 teaches the preparation of a particular sulfurized triisobutylene composition which is noncorrosive and found to be excellent antioxidant for automotive engine oils, that is, to contain an inactive sulfur. The patent essentially discloses the reaction of sulfur and triisobutylene at a temperature between about 350 and 420° F. utiliizng a mole ratio of sulfur to triisobutylene of about 1:5 under atmospheric conditions. The patent requires atmospheric conditions for manufacture since pressure is stated therein to cause corrosivity. Further, the patent lists various ways of inhibiting corrosivity in conjunction with the atmospheric pressure, that is, by washing the product with sodium hydroxide or sodium sulfide or by treating the formed sulfurized triisobutylene product with diisobutylene. It is to be noted the price paid for conducting the reaction at essentially atmospheric pressure as opposed to superatmospheric pressure is substantially extended reaction times for an equivalent product.

We have discovered, and this constitutes our invention, a method of producing sulfurized triisobutylene in a materially reduced reaction time having improved extreme pressure properties and substantially reduced corrosivity to copper, that is, an ASTM copper rating (3 hour/250° F.) of less than 4A, the resultant product not requiring the prior art treatments of extraction with sodium sulfide, sodium hydroxide or contact with diisobutylene in order to produce a product having acceptably low sensitivity to copper. Our invention further encompasses a unique combination of compounds broadly categorized as sulfurized triisobutylene resulting from said procedure and lubricating oil compositions containing the unique combination. As heretofore stated, these results are essentially accomplished by forming the product via a particular combination of reactants, conditions and sequential steps as defined below.

The method of the invention comprises the following sequential step combination:

(1) Mixing step.—Mixing triisobutylene and sulfur in a mole ratio of between about 1:2.5 and 1:5, preferably about 1:3, at a temperature between about 50 and 100° F., preferably about 65–75° F.

(2) Reaction step.—Passing (blowing) inert gas through the formed mixture with an inert gas at a rate of between about 0.1 and 1 standard cubic feet per hour (s·c.f.h.)/gallon mixture, preferably between about 0.3 and 0.6 s.c.f.h./gal., at a continuous pressure between about 20 and 100 p.s.i.g., preferably between about 30 and 40 p.s.i.g., and temperature to between about 375 and 465° F., preferably between about 440 and 455° F., and continuing until the free sulfur content in the formed mixture is less than 0.3 wt. percent.

(3) Stripping step.—Passing inert gas through the blown mixture at a temperature between about 320 and 360° F., preferably between about 340 annd 350° F., under subatmospheric pressure, advantageously under a pressure of between about 1 and 200 mm. Hg, preferably between about 2 and 100 mm. Hg, until less than about 40 p.p.m. $H_2S$ is detected in the stripping gas.

(4) Filtering step.—Filtering the stripped product via standard means, e.g., utilizing filter paper, in line cartridge filtering and/or diatomaceous earth filtering means at ambient temperature and pressure.

The filtered product is a red colored liquid determined to be a major amount of complex mixture containing a major amount of (e.g., 99–100 wt. percent) 4-neopentyl-5-tertiary butyl-1,2-dithiole-3-thione and a minor amount (e.g., 0–1.0 wt. percent) of organic sulfides, polymeric sulfur substituted compounds, mercaptans and the like, essentially giving the following general analysis:

| Tests: | Range |
|---|---|
| Specific gravity, 60/60° F. | 1.12–1.13 |
| Kin. vis., at | |
| 100° F. | 50–120 |
| 210° F. | 5–8 |
| Sulfur, wt. percent | 31.5–40.0 |
| $H_2S$, p.p.m. | 5–40 |
| Average molecular weight | 260–280 |
| Flash, COC, ° F. | 320–360 |
| Copper strip corrosion 3 hours/250° F. 1 wt. percent in paraffinic oil (125 SUS at 100° F.) | <4A |
| Acetone insolubles, wt. percent: | <0.01 max. |
| Free sulfur, wt. percent: | <0.3 max. |

In the foregoing procedure the reaction period for Step 1 (mixing and heat up) is normally between about 0.5 and 5 hours, for Step 2 (reaction) between about 10–20 hours, Step 3 (stripping) between about 8 and 15 hours and Step 4 (filtering) between about 0.25 and 1 hour. It is to be noted a 30- to 40-hour period is normal for Step 2 under atmospheric conditions in order to produce an equivalent product.

The inert gas employed is usually nitrogen since it is readily available and inexpensive. Other gases, however, which are inert to the reaction can be utilized such as carbon dioxide.

Since triisobutylene is a liquid at room temperature having a boiling range between about 348 and 354° F., diluent is normally not required, the triisobutylene functioning as such in addition to its function as a reactant.

As heretofore stated, the reaction period is normally about 10 to 20 hours, that is, Step 2. During said period the reactor is periodically monitored and the reaction is normally judged complete when the hydrogen sulfide in the exit gas is reduced to less than about .0013 s.c.f.h./lb. charge or when less than 0.01 wt. percent sediment (free sulfur) occurs when 200 ccs. of sample is dissolved in 80 ccs. of acetone. However, additional reaction time may be required after the aforementioned values are attained if further reduction of copper corrosivity of the final product is deemed desirable.

The resultant sulfurized triisobutylene product, as heretofore stated, is an effective EP additive in gear and cutting oils. It is normally present in the base oil in an amount of about 0.3 and 10 wt. percent, preferably between about 3 and 7 wt. percent. The base oils employed are advantageously naphthenic and paraffinic mineral oils of an SUS viscosity between about 100 and 2500 at 100° F. In a typical gear and cutting oil lubricant composition in addition to the sulfurized triisobutylene EP products, other additives are normally present such as VI improvers (e.g., polyalkylmethacrylate), detergent dispersants (e.g., alkenyl succinimides), wear inhibitors (e.g., lauryl or oleyl acid orthophosphate), rust inhibitors (e.g., oleyl amine) and lubricity agents (e.g. fatty carboxylic acids and lauryl oleyl acid orthophosphate).

An important aspect of the subject method is the use of inert gas blowing coupled with continuous pressure greater than 25 p.s.i.g. during the entire reaction period. In the past, inert gas blowing was usually limited to facilitating mixing of initial components and stripping of the final product. It has been found if inert gas is introduced under the conditions defined in the reaction period, a significant increase in pressure can be tolerated with a resultant significant drop in reaction time essentially without an increase in corrosivity to copper or decrease in EP properties of the product. It is hypothesized that blowing of the reaction mixture during the entire reaction under the conditions defined removes by-product $H_2S$ as soon as it is formed and prevents its reaction with triisobutylene to form $C_{12}$ mercaptans. Mercaptans in this molecular weight range are not very corrosive to copper and, therefore, it was previously believed that early removal of $H_2S$ was unnecessary. However, with the discovery of the unexpected results obtained from the essentially instantaneous $H_2S$ removal under the conditions defined, it is now hypothesized the formed $C_{12}$ mercaptans in the presence of free sulfur form polysulfides which are corrosive, and therefore, early removal of $H_2S$ during the reaction period under pressure conditions is essential.

EXAMPLE I

The following overall procedure was employed in three runs as set forth in the following step sequence:

(1) To a 10-gallon oil heated, stainless steel reactor there was charged triisobutylene and stirring was initiated.

(2) Sulfur was charged.

(3) Nitrogen blowing was initiated through a sparger to bring the reactor to the desired pressure.

(4) The reactor was rapidly heated and nitrogen blowing continued (some reaction takes place).

(5) The desired reaction temperature was maintained together with the nitrogen blowing under reflux conditions (reaction period).

(6) The reaction mixture was then cooled with continued nitrogen blowing.

(7) The cooling step was followed by stripping the reaction mixture with nitrogen blowing under vacuum.

(8) The resultant oil was then filtered through an in line filter fitted with a filter cartridge.

The recovered sulfurized triisobutylene filtrate was analyzed and determined to be a mixture of many compounds wherein a major portion of the filtrate was identified as 4 - neopentyl-5-tertiary butyl-1,2-dithiole-3-thione and a minor quantity of mercaptans and organic sulfides.

The test data, analysis of the product and properties of the lube compositions thereof are reported below in subsequent tables:

TABLE I.—PROCESS DATA

| Run | A | B | C |
|---|---|---|---|
| Ingredient quantities: | | | |
| Sulfur, lbs | 19 | 19 | 19 |
| TIB, lbs | 30 | 30 | 30 |

| Conditions | Time, hrs. | Temp., ° F. | Pressure, p.s.i.g. | $N^2$, s.c.f.h./ gallon |
|---|---|---|---|---|
| Steps: | | | | |
| 1 and 2 | 0.5 | 72 | 0 | 0 |
| 3 | 0.1 | 72 | 0.30 | 0 |
| 4 | 1.75 | 80–390 | 30 | 0.3 |
| 5 | 10 | 390–450 | 30 | 0.3 |
| 6 | 1 | 450–340 | 30 | 0.3 |
| 7 | 8 | 340–350 | (¹) | 0.4 |
| 8 | 0.5 | 340 | 0 | 0 |
| Run B | | | | |
| 1 and 2 | 0.5 | 72 | 0 | 0 |
| 3 | 0.1 | 72 | 0–30 | 0 |
| 4 | 2 | 80–405 | 30 | 0.3 |
| 5 | 10 | 405–450 | 30 | 0.3 |
| 6 | 1 | 450–340 | 30 | 0.3 |
| 7 | 8 | 340–350 | (²) | 0.4 |
| 8 | 0.5 | 340 | 0 | 0 |
| Run C | | | | |
| 1 and 2 | 0.5 | 72 | 0 | 0 |
| 3 | 0.1 | 72 | 0–30 | 0 |
| 4 | 1 | 80–390 | 30 | 0.3 |
| 5 | 10 | 390–455 | 30 | 0.3 |
| 6 | 1 | 455–340 | 30 | 0.3 |
| 7 | 8 | 340–350 | (³) | 0.4 |
| 8 | 0.5 | 340 | 0 | 0 |

¹ 2 mm. Hg.  ² 5 mm. Hg.  ³ 4 mm. Hg.

TABLE IA.—PRODUCT DATA

|  | A | B | C |
|---|---|---|---|
| Sp. gr., 60/60° F | 1.1320 | 1.1391 | 1.1380 |
| Kin. vis., cs. at— |  |  |  |
| 100° F | 105.3 | 95.0 | 100.3 |
| 210° F | 6.5 | 6.7 | 7.0 |
| Sulfur, wt. percent (X-ray) | 38.6 | 37.2 | 37.4 |
| Acetone insolubles, wt. percent | 0.011 | 0.01 | 0.01 |
| Copper strip corr., 3 hrs. at 250° F. on: |  |  |  |
| (a) 1.0 wt. percent in comp. WW [1] | 3A | 3A | 3A |
| (b) 6.0 wt. percent in comp. XX [2] | 1B | 1B | 1B |
| Molecular wt | 269 | 273 | 275 |
| Flash, COC, ° F | 330 | 340 | 380 |
| Free sulfur, wt. percent | Trace | Trace | Trace |
| H²S, p.p.m | 7 | 20 | 1 |

[1] Comp. WW=1 wt. percent of sulfurized triisobutylene product of run plus 99 wt. percent paraffinic lube oil of 125 SUS at 100° F.
[2] Comp. XX=6 wt. percent sulfurized triisobutylene product of run, 91 wt. percent paraffinic oil (35 wt. percent of 340 SUS at 100° F. and 57 wt. percent of 160 SUS at 210° F.), 1 wt. percent ethyloleyl orthophosphate, 1 wt. percent oleyl amine, 1 wt. percent 2,5-bis (octyldithio) thiadiozole plus polymer of octadecyl, -butyl, -dodecyl methacrylate and tetraethylene pentamine plus silicone antifoamant.

EXAMPLE II

This example illustrates an analogous comparative procedure utilizing superatmospheric pressure with no inert gas blowing during the reaction stage wherein the sulfurized triisobutylene product was unsatisfactory in respect to copper corrosivity.

TABLE II

|  | Run D | Run D |
|---|---|---|
| Charge, lbs.: |  |  |
| Triisobutylene | 34 | 41.5 |
| Sulfur | 21.5 | 25.8 |
| Conditions: |  |  |
| Heat-up: |  |  |
| Time | 2 | 1.5 |
| Temperature, ° F | 80-390 | 89-300 |
| Pressure, p.s.i.g | 25 | 50 |
| N₂ rate, s.c.f.h | 2 |  |
| Reaction: |  |  |
| Time, hrs | 32 | 32 |
| Temperature, ° F | 414 | 410 |
| Pressure, p.s.i.g | 25 | 50 |
| N₂ rate, s.c.f.h |  |  |
| Stripping: |  |  |
| Time, hrs., ° F | 8 | 8 |
| Temperature, ° F | 302 | 300 |
| Vacuum, mm. Hg | 110-19 | 0 |
| N₂ rate, s.c.f.h | 0 | 4 |
| Filtration: |  |  |
| Time, hrs | 3.25 | 0.1 |
| Temperature, ° F | 150 | 150 |
| Tests: |  |  |
| Sp. gr., 60/60° F | 1.1224 | 1.0891 |
| Kin. vis., cs. at— |  |  |
| 100° F | 70.90 | 89.96 |
| 210° F | 5.95 | 6.30 |
| Sulfur, wt. percent, X-ray | 31.7, 31.7 | 32.8 |
| Acetone insolubles, wt. percent | 0.04 | 0.002 |
| Copper strip corrosion, 3 hr./250° F. on: (a) 1.0 wt. percent in Comp. WW [1] | 4A | 4C |
| Mol., wt | 265 | 266 |
| Flash, COC, wt. percent | 355 | 355 |
| Free sulfur, wt. percent | 0.09 | Trace |
| H₂S, p.p.m | 4 | 5 |

[1] See Table IA for composition details.

EXAMPLE III

This comparative example when compared to Example I illustrates the substantial increase in reaction time required in order to produce an equivalent sulfurized triisobutylene product when the reaction is conducted under essentially atmospheric pressure conditions as opposed to the pressure conditions of Example I, specifically about 12-13 hours reaction time for Example I procedure as opposed to 33.5 hours for comparative Example III procedure. The comparative procedure is as follows:

To a 10-gallon stirred, stainless steel reactor there were charged at ambient temperature triisobutylene and flowers of sulfur. Nitrogen blowing was instituted and continued throughout the entire reaction. The reaction mixture was heated from ambient to the desired elevated temperature and the reaction pressure adjusted via control of the nitrogen gas exit rate. At the end of the reaction period, the reaction mixture was cooled with continued nitrogen blowing, stripped under reduced pressure and filtered. The test data, product analysis and testing of the product in composition are set forth in Table III:

TABLE III

|  | Run E |
|---|---|
| Process data: |  |
| Ingredient quantities: |  |
| Sulfur, lbs | 34 |
| TIB, lbs | 51.5 |
| N₂, s.c.f.h./lb. feed | 0.072 |
| Filter aid, lbs | 1 |

| Steps | Run E Hours | ° F. |
|---|---|---|
| 1 Charge TIB + S | 0.25 | 72 |
| 2 Pressure reactor to 15 p.s.i.g |  | 72 |
| 3 Reactor, 15 p.s.i.g. N₂ | 2.5 | 87-392 |
| 4 Reactor, 15 p.s.i.g. N₂ | 10 | 392-430 |
| 5 Reactor, 10 p.s.i.g. N₂ | 1 | 425 |
| 6 Reactor, 0 p.s.i.g. N₂ | 21 | 425 |
| 7 Cool plus N₂ | 3 | 320-432 |
| 8 Strip plus N₂ blow, 20-25 mm. Hg | 8 | 325 |
| 9 Filter | 0.25 | 150 |

|  | Run E |
|---|---|
| Product data: |  |
| Sulfur, wt. percent | 35.6 |
| Sp. gr., 60/60° F | 1.1326 |
| Kin. vis., at— |  |
| 100° F | 123 |
| 210° F | 7.8 |
| Molecular wt | 265 |
| H₂S, p.p.m | 3 |
| Free sulfur, wt. percent | Trace |
| Flash, COC, ° F | 370 |
| Copper strip cor., 3 hr./250° F., Comp. WW [1] | 2B |

[1] Comp. WW=1 wt. % of sulfurized triisobutylene product of Run E plus 99 wt. percent paraffinic oil of 125 SUS at 100° F.

EXAMPLE IV

This example illustrates the extreme pressure qualities of lubricating oil compositions containing the sulfurized triisobutylene products of the type prepared in Example I. The test employed is the well known SAE EP test whose results are set forth in terms of pounds load at failure at specific engine r.p.m.

The compositions tested and results are as follows:

TABLE IV

|  | F | G |
|---|---|---|
| Ingredients, wt. percent: |  |  |
| Mineral oil (mix of 340 SUS at 100° F. and 50 SUS 26 210° F.) | 89.5 | 89.5 |
| Sulfurized TIB | [1] 6 | [2] 6 |
| N-C₁₂ alkyl and dialkyl phosphate | 2.6 | 2.6 |
| Oleylamine | 1.0 | 1.0 |
| 2,5-bis(octyldithio)thiadazole plus polymer of lauryl and stearyl methacrylate plus polymer of butyl-, dodecyl-, octyldecyl methacrylate and tetraethylene pentamine plus silicone antifoamant | 0.9 | 0.9 |
| SAE EP test: |  |  |
| 1,000 r.p.m., lbs | 336 | 340 |
| 1,500 r.p.m., lbs | 168 | 208 |

[1] Product Run A—Table IA.
[2] Product Run B—Table IA.

We claim:

1. A lubricating oil composition comprising a major amount of hydrocarbon lubricating oil of an SUS viscosity of between about 100 and 2500 at 100° F. containing between about 0.3 and 10 wt. percent of a sulfurized triisobutylene product having a specific gravity at 60/60° F. of between about 1.12 and 1.13, a kinematic viscosity at 100° F. of between about 60 and 120, a sulfur content of between about 31.5 and 40 wt. percent, a free sulfur content of less than 0.3 wt. percent, an acetone insoluble content of less than 0.01 wt. percent, and an average molecular weight of at least about 260, said product prepared by the process comprising:

(a) mixing triisobutylene with sulfur at a temperature of between about 50 and 100° F. utilizing a mole ratio of triisobutylene to sulfur of between about 1:2.5 and 1:5, (b) continuously passing an inert gas through the resultant mixture maintained at a temperature between about 375 and 465° F. under continuous pressure between about 25 and 100 p.s.i.g. at a rate of between about 0.1 and 1 s.c.f.h. per gallon of resultant mixture for a period of between about 10 and 20 hours and until the free sulfur in the resultant mixture is less than 0.3 wt. percent, (c) stripping the inert gas treated resultant mixture with inert gas at a gas rate of between about 0.1 and 1 s.c.f.h. per gallon of reaction mixture and a temperature between about 320 and 360° F. under subatmospheric pressure, (d) and filtering the reduced pressure treated mixture to recover said product as filtrate.

2. A composition in accordance with claim 1 wherein said inert gas is nitrogen.

3. A composition in accordance with claim 1 wherein said subatmospheric pressure is between about 100 and 200 mm. Hg pressure, said stripping is continued in Step (c) until the exit gas contains less than about 40 p.p.m. $H_2S$.

References Cited
UNITED STATES PATENTS

| | | | |
|---|---|---|---|
| 2,995,569 | 8/1961 | Hamilton et al. | 252—45 X |
| 2,658,900 | 11/1953 | Stevens et al. | 260—327 C |
| 2,312,750 | 3/1943 | Cohen | 260—139 X |
| 2,142,916 | 1/1939 | Parkhurst | 252—45 |
| 2,545,875 | 3/1951 | Cade | 260—139 |
| 2,786,829 | 3/1957 | Stevens et al. | 252—45 X |
| 3,673,090 | 6/1972 | Waldbillig et al. | 252—45 |

W. H. CANNON, Primary Examiner

U.S. Cl. X.R.

260—139